(12) United States Patent
Kim et al.

(10) Patent No.: US 6,403,266 B1
(45) Date of Patent: Jun. 11, 2002

(54) POLYMER ELECTROLYTE COMPOSITION, METHOD FOR PREPARING THE SAME AND LITHIUM SECONDARY BATTERY EMPLOYING THE SAME

(75) Inventors: Hee Tak Kim, Soowon; Kyoung Bae Kim; Sun Wook Kim, both of Seoul, all of (KR)

(73) Assignee: Ness Energy Co., Ltd., Suwon-si (KR)

( * ) Notice: Subject to any disclaimer, the term of this patent is extended or adjusted under 35 U.S.C. 154(b) by 0 days.

(21) Appl. No.: 09/484,535

(22) Filed: Jan. 18, 2000

(51) Int. Cl.$^7$ ............................................. H01M 10/40
(52) U.S. Cl. ...................... 429/314; 429/316
(58) Field of Search ................................. 429/314, 316

(56) References Cited

U.S. PATENT DOCUMENTS 5,922,493 A * 7/1999 Humphrey et al. .......... 429/316
6,051,343 A * 4/2000 Suzuki et al. ............... 429/316
6,124,061 A * 9/2000 Hamano et al. ............. 429/316

FOREIGN PATENT DOCUMENTS

EP          858119     *  8/1998

* cited by examiner

*Primary Examiner*—Stephen Kalafut
(74) *Attorney, Agent, or Firm*—Jacobson Holman, PLLC

(57) ABSTRACT

Disclosed are a polymer electrolyte composition, a method for preparing the same and a lithium secondary battery employing the same. The polymer electrolyte composition comprises a polymer mixture and a solvent in which a lithium salt is disclosed. The polymer mixture includes polyvinylidene fluoride-based polymer and at least one polymer selected from the group consisting of polyacrylonitrile and polymethyl methacrylate. Polyvinylidene fluoride-based polymer which has a good mechanical strength, polymethyl methacrylate polymer which has a good affinity and polyacrylonitrile polymer which has a good adhesiveness to electrodes are utilized. As a result, the mechanical strength and the adhesiveness to the electrodes of the polymer electrolyte can be improved to obtain a lithium secondary battery which has a stable charge/discharge characteristic and a high capacity.

17 Claims, 10 Drawing Sheets

POLYMER ELECTROLYTE COMPOSITION, METHOD FOR PREPARING THE SAME AND LITHIUM SECONDARY BATTERY EMPLOYING THE SAME

BACKGROUND OF THE INVENTION

1. Field of the Invention

The present invention relates to a polymer electrolyte composition, a method for preparing the same and a lithium secondary battery employing the same, and more particularly, to a polymer electrolyte composition, a method for preparing the same and a lithium secondary battery employing the same which has a high ionic conductivity, good mechanical properties, a stable interface characteristic, an efficient and good discharging characteristic at high and low temperatures.

2. Description of the Prior Art

There has been a great deal of interest in developing better and more efficient methods for storing energy for applications such as cellular communication, satellites, portable computers and electric vehicles. Particularly, much effort has been dedicated to the development of a lithium ion battery having an cathode including lithium, a anode including lithium or carbon and a non-aqueous electrolyte, because of its higher energy density than that of a lead storage battery or nickel-cadmium battery having an aqueous electrolyte.

Recently, the widely used lithium ion battery which has a satisfactory ionic conductivity utilizes a liquid electrolyte, however, there is frequent occurrence of leakage of the liquid electrolyte out of the case. Moreover, any leakage in the cell lessens the performance of the battery. Accordingly, lithium ion batteries are packaged by utilizing an aluminum can and are provided with various protective devices, thereby enlarging the volume of the cell, resulting in an undesirable reduction of energy density. Further, such lithium ion battery is not applicable to a battery having a thickness of 3 mm or less.

In contrast, solid electrolytes are free from problems of leakage, however, they tend to exhibit inferior properties compared to the liquid electrolytes. This is attributed by the fact that ionic conductivities for the solid electrolytes are often 5–100 times poorer than for the liquid electrolytes.

Generally, a polymer lithium secondary battery includes an anode, a polymer electrolyte and a cathode. The components are selected for satisfying various conditions for the secondary battery such as lifetime, capacity, temperature characteristic, stability, etc.

As for the components for the cathode applied to the secondary battery, lithium oxide complex ($LiCoO_2$, $LiMn_2O_4$, $LiNiO_2$) which has a laminated structure and lithium ion can be inserted/separated between layers, can be utilized. As for the components for the anode, carbon compounds such as graphite compounds or coke can be utilized. Examples of which include mesocarbon microbean (MCMB) and mesophase carbon fiber.

Such polymer electrolyte widely utilized as main component of the lithium battery which is free from the problem of leakage. The manufacturing of the battery utilizing the polymer electrolytes is advantageous. However, the polymer electrolyte is required to have a good ionic conductivity, a thermal and electrochemical stability, a good mechanical strength and a good adhesiveness to the electrodes.

The polymer electrolyte currently utilized or under development include a main liquid-type organic solvent such as ethylene carbonate and propylene carbonate, a vice liquid-type organic solvent such as dimethyl carbonate, diethyl carbonate and ethyl methyl carbonate, and polyvinylidene difluoride-based compounds (PVdF), polyacrylonitrile (PAN), polyethylene oxides, a copolymer thereof or a mixture thereof, which can accept lithium salts such as $LiPF_6$ and $LiAsF_6$.

The polymer electrolyte including the polyvinylidene fluoride compounds has a good mechanical strength. However, the adhesiveness to the electrodes is not sufficient. This necessitates an adhering process by utilizing heat or pressure. During the adhering process of the electrodes with the electrolyte, the solvent may evaporate. Thus, films not containing the electrolyte are adhered to the electrodes and then additional impregnation process into the solvent is implemented.

When polyacrylate polymer electrolytes having a good affinity to the solvent are utilized in order to increase the adhesiveness to the electrodes, a good adhesiveness to the electrodes can be accomplished; however, the electrolytes exhibit a poor mechanical strength.

One class of polymer electrolytes, specifically gel electrolytes in which liquid electrolyte is dispersed in a polymer matrix, includes a significant fraction of solvents in addition to the salt is contained in the polymer matrix.

A method for preparing the gel electrolytes is disclosed in U.S. Pat. No. 5,456,000. A battery is assembled with a gel electrolyte to leave the electrolyte salt and solvent out of the polymer gel system until after the cell is completely fabricated. Thereafter, the solvent and the electrolyte salt may be introduced into the polymer system in order to swell the battery. This battery has an advantage of allowing the cell to be fabricated in a non-dry environment. However, a film is formed from a polymer containing a plasticizer in order to facilitate the impregnation of the polymer film with the solvent and then the battery is assembled. The plasticizer is then extracted out to form a microporous film and the solvent used for the extraction is evaporated. Such process requiring homogeneous impregnation of the polymer with the solvent requires many hours which lengthens the processing time.

In order to overcome the above-described problem, U.S. Pat. No. 5,219,679 discloses a method for preparing a polymer electrolyte after mixing polymer and solvent. By this method, the solvent is already homogeneously dispersed into the polymer prior to the assembling of a battery. As such, an additional process of extraction of a plasticizer or drying is not necessary. However, the preparation of the polymer electrolyte and the assembling of the cell should be implemented under a dry condition. Further, when the polymer electrolyte contains a large amount of solvent, its mechanical strength is poor, which makes a continuous processing is difficult and an electrical short is liable to generate.

U.S. Pat. Nos. 5,585,039, 5,639,573, 5,716,421 and 5,688,293 disclose polymer electrolytes prepared by filling polymer electrolytes into porous films having good mechanical strength to overcome the problems of the mechanical strength. According to these methods, a filling process or a coating process of the electrolyte into or onto the porous film is additionally implemented, thus complicating the manufacturing process of the battery.

Therefore, it is preferred that a gel polymer electrolyte containing a polymer and a solvent is prepared, and then an anode, a cathode and thus obtained polymer electrolyte are integrated to manufacture the battery, which simplifies the manufacturing process of the battery.

For this case, since only one coating process is necessary for the preparation of the polymer electrolyte, ionic conductivity, mechanical strength of a mixture state of the polymer and the solvent and the interface adhesiveness to the electrodes are anticipated to exhibit good qualities. Since the polymer electrolyte impregnated with the solvent is integrated, a lamination method at a high temperature cannot be utilized. Accordingly, the polymer electrolyte should have a good interface adhesiveness to the electrodes.

U.S. Pat. No. 5,849,433 discloses a method for preparing a polymer electrolyte by utilizing a material having a good mechanical strength and adhesiveness in order to improve the mechanical properties. According to the method, the polymer electrolyte is prepared by forming a film from a mixture of materials having good mechanical strength and adhesiveness to obtain a desired polymer electrolyte and then impregnating the film with a liquid electrolyte.

However, in this method, additional impregnation process of the polymer film with the liquid electrolyte is necessary to complicate the manufacturing of the polymer electrolyte.

SUMMARY OF THE INVENTION

Accordingly, it is an object of the present invention to provide a polymer electrolyte composition having a good mechanical strength and adhesiveness.

Another object of the present invention is to provide a method for preparing a polymer electrolyte having a good mechanical strength and adhesiveness.

Further another object of the present invention is to provide a lithium secondary battery employing a polymer electrolyte having a good mechanical strength and adhesiveness.

To accomplish the object, there is provided in the present invention a polymer electrolyte composition comprising a polymer mixture and a solvent in which a lithium salt is dissolved. The polymer mixture includes polyvinylidene fluoride-based polymer and at least one polymer selected from the group consisting of polyacrylonitrile and polymethyl methacrylate.

Another object of the present invention can be accomplished by a method for preparing a polymer electrolyte composition in which a polymer mixture including polyvinylidene fluoride-based polymer and at least one polymer selected from the group consisting of polyacrylonitrile and polymethyl methacrylate, and a solvent in which a lithium salt is dissolved, are mixed in a mixing ratio range of 1:3–10 by weight, then, heating the mixture.

Further object of the present invention can be accomplished by a lithium secondary battery including a polymer electrolyte composition comprising a polymer mixture and a solvent in which a lithium salt is dissolved. The polymer mixture includes polyvinylidene fluoride-based polymer and at least one polymer selected from the group consisting of polyacrylonitrile and polymethyl methacrylate.

Polyvinylidene fluoride-based polymer includes a large amount of solvent and lithium salts and provides a good mechanical strength. Polymethyl methacrylate polymer has a good affinity to the solvent which strongly adheres electrolyte to the electrodes. Polyacrylonitrile polymer has a good adhesiveness to the electrolyte, thus it improves the adhesiveness of the electrolyte to the electrodes without deteriorating the excellent mechanical properties of the polyvinylidene fluoride-based polymer.

According to the present invention, an electrolyte having good mechanical properties and a good adhesiveness to the electrodes is mixed with a solvent to obtain a polymer electrolyte in which the phases of the polymer and the solvent are separated. Therefore, the mechanical strength of the electrolyte can be increased and the affinity of the electrolyte with the solvent can be improved to minimize the leakage and evaporation of the solvent in the polymer electrolyte. As a result, a lithium secondary battery having a stable charge/discharge characteristic and a high capacity can be manufactured. Further, since the electrolyte of the present invention has a good adhesiveness to the electrodes, a contacting resistance of thus obtained battery is small and a local concentration of a current can be prevented to improve the performance of the battery during charge/discharge thereof.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENT

Figure 1:
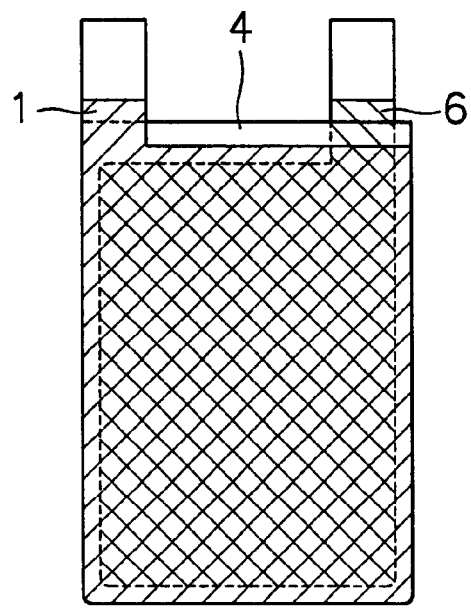
FIG. 1 is a schematic diagram for showing a planar structure of a lithium secondary battery including a polymer electrolyte composition according to the present invention.

The present invention will be explained in more detail below.

The polymer electrolyte of the present invention is obtained by mixing a polymer mixture and a solvent. The polymer mixture includes a first polymer selected from the group consisting of polyvinylidene fluoride (PVdF) and a copolymer thereof, and a second polymer selected from the group consisting of polymethyl methacrylate (PMMA) and polyacrylonitrile.

As for the polymer, the preferred polymethyl methacrylate has a molecular weight in the range of about 100,000–2,000,000 and a poly disperse index in the range of 1–4. Preferred polyacrylonitrile and polyvinylidene fluoride have molecular weights in the range of about 50,000–1,000,000 and poly disperse indexes in the range of 1–4.

As for the polyvinylidene fluoride copolymer, the preferred addition amount of hexafluoropropane is about 2–30% by weight based on the total amount of the copolymer. And it is preferred that the molecular weight of polyvinylidene fluoride-cohexafluoropropane(PVdF-HFP) is in the range of about about 50,000–1,000,000 and the poly disperse index is in the range of 1–4.

If the molecular weights of the above-described polymers are less than the minimum values, the mechanical strengths of thus obtained batteries become poor, and if greater than the maximum values, the viscosities of the polymer electrolyte solutions increase and the manufacturing of films becomes difficult.

When the polymer mixture is obtained by mixing polyvinylidene fluoride and polymethyl methacrylate, and when the amount of polyvinylidene fluoride is 50% by weight or less based on the total amount of the mixture, the mechanical strength decreases and when the amount of polymethyl methacrylate is 10% by weight or less based on the total amount of the mixture, the adhesiveness to the electrodes deteriorates to separate the electrodes and the electrolyte during an adhering process or to evaporate the solvent.

Accordingly, the preferred amount of polyvinylidene fluoride is in the range of 50–90% by weight and that of polyacrylate-based polymer is in the range of 50–10% by weight.

After obtaining the polymer mixture, about 2–50% by weight of silicon oxide ($SiO_2$), zeolite and aluminum oxide ($Al_2O_3$) can be added.

When the polymer mixture is obtained by mixing polyacrylonitrile and polyvinylidene fluoride, the preferred amount of polyacrylonitrile is 50–75% by weight and that of polyvinylidene fluoride is 50–25% by weight. If the amount of polyacrylonitrile is less than 50% by weight, the adhesiveness between the electrodes and electrolyte is lowered and if the amount of polyacrylonitrile is above 75% by weight, mechanical strength is lowered.

When the polymer mixture is obtained by mixing polyvinylidene fluoride copolymer and polymethyl methacrylate, the preferred amount of polyvinylidene fluoride copolymer is 50–90% by weight and that of polymethyl methacrylate is 50–10% by weight. If the amount of polyvinylidene fluoride copolymer is less than 50% by weight, the mechanical strength is lowered and if that of polymethyl methacrylate is less than 10% by weight, the adhesiveness between the electrodes and the electrolyte is lowered to cause a separation of the electrodes and the electrolyte during the adhering process or cause an evaporation of the solvent.

The polymer mixture can be obtained by mixing the polyvinylidene fluoride, polyvinylidene fluoride copolymer and polymethyl methacrylate or obtained by mixing polyvinylidene fluoride, polymethyl methacrylate and polyacrylonitrile.

If the polymer mixture is obtained by mixing polyvinylidene fluoride, polyvinylidene fluoride copolymer and polymethyl methacrylate, the preferred amount of polyvinylidene fluoride and polyvinylidene fluoride copolymer is in the range of 50–90% by weight and that of polymethyl methacrylate is in the range of 50–10% by weight. At this time, the preferred amount of polyvinylidene fluoride is 40% by weight or less based on the total amount of polyvinylidene fluoride and polyvinylidene fluoride copolymer.

Polyvinylidene fluoride improves the mechanical strength of the polymer electrolyte and facilitates the impregnation of the electrodes with the solvent. If the amount of polyvinylidene fluoride is out of the given range, the adhesiveness between the electrodes and the electrolyte becomes too weak and they are liable to separate.

When the polymer mixture is obtained by mixing polyvinylidene fluoride, polymethyl methacrylate and polyacrylonitrile, the preferred amount of polyvinylidene fluoride is 25–50% by weight and that of polymethyl methacrylate and polyacrylonitrile is 50–75% by weight. At this time, the amount of polymethyl methacrylate is 30% by weight or less based on the total amount of polymethyl methacrylate and polyacrylonitrile. If the amount of polymethyl methacrylate is out of the given range, the mechanical strength of the polymer electrolyte is lowered and an electric short of a battery occurs easily.

As for the solvents utilized for the polymer electrolyte, ethylene carbonate (EC), propylene carbonate (PC), diethyl carbonate (DEC), dimethyl carbonate (DMC), ethyl methyl carbonate (EMC), gamma-butyrolactone ($\gamma$-BL) and a mixture thereof can be exemplified. The preferred mixing ratio of the polymer mixture and the solvent is in the range of 1:3–10, more preferably in the range of 1:4–8. If the mixing ratio of the polymer mixture is over the upper limit, adhesiveness and ionic conductivity decrease even though a good mechanical strength can be accomplished. If the mixing ratio of the polymer mixture is less than the lower limit, the mechanical strength of the polymer electrolyte is lowered.

In order to increase discharge capacity at a low temperature, it is preferred that the amount of ethylene carbonate is less than 50% by weight based on the total amount of the solvent. And if the amount of ethylene carbonate is less than 20% by weight, dissociation degree of a salt decreases. Therefore, it is preferred that the amount of ethylene carbonate is about 20–50% by weight based on the total amount of the solvent.

Ethyl methyl carbonate, diethyl carbonate and dimethyl carbonate can prevent crystallization of ethylene carbonate and lower the viscosity of the solvent to improve the characteristics at low temperature. The preferred amount of ethyl methyl carbonate, diethyl carbonate and dimethyl carbonate is in the range of 20–70% by weight based on the total amount of the solvent. If the amount is over 70% by weight, volatilization occurs at a high temperature.

In order to control the mechanical strength, adhesiveness and ionic conductivity of the polymer electrolyte, a solvent which does not lower the characteristics at a low temperature while controlling the polarity of the solvent, is required. Propylene carbonate and $\gamma$-butyrolactone($\gamma$-BL) satisfy these requirements. Even though viscosities of these solvents are higher than those of ethyl methyl carbonate, diethyl carbonate and dimethyl carbonate, melting points are lower than those of the three solvents to restrain crystallization at a low temperature and to give a good dissociation degree of salts. Accordingly, it is preferred that propylene carbonate and $\gamma$-BL are added to ethylene carbonate, or to a mixture of ethyl methyl carbonate, diethyl carbonate and dimethyl carbonate to control the properties of the polymer electrolyte.

The preferred amount of propylene carbonate and γ-BL are in the range of 5–40% by weight based on the total amount of the solvent.

As for the lithium salt, 0.5–2M of lithium perchlorate (LiClO$_4$), lithium trifluoromethane sulfonate (LiCF$_3$SO$_3$), lithium borofluoride (LiBF$_4$), lithium hexafluorophosphate (LiPF$_6$), lithium arsenic hexafluoride (LiAsF$_6$) or a mixture thereof are exemplified. At this time, LiPF$_6$ is advantageous for improving the ionic conductivity and LiClO$_4$ is advantageous for increasing the lifetime of the battery.

When the polymer mixture and the electrolyte are mixed to prepare the polymer electrolyte in which each phase is separated, the mechanical strength can be largely increased when comparing with the conventional polymer electrolyte in which a polymer mixture and a a solvent are homogeneously mixed.

The method for preparing the polymer electrolyte utilizing the polymer mixture is as follows.

A polymer mixture and a solvent including electrolytic salts are mixed in a mixing ratio of 1:3–10 at room temperature. Then, thus obtained mixture is firstly heated to about 25–100° C. for about 10 minutes to 3 hours and then is heated again to about 100–180° C. for about 5 minutes to 1 hour to prepare a homogeneous and viscous polymer electrolyte solution. At this time, the first heating can be omitted.

If thus obtained polymer electrolyte solution is not homogeneous and a part of the polymer is not dissolved, the mechanical strength of the polymer electrolyte and the uniformity of a film are lowered.

The lithium secondary battery including the polymer electrolyte according to the present invention and the method for manufacturing the same, will be explained with reference to attached FIGS. 1–3.

Figure 2:
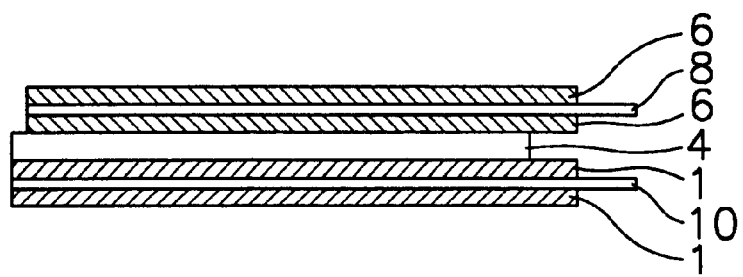
FIG. 2 is a schematic diagram for showing a structure of a unit cell of a lithium secondary battery including a polymer electrolyte composition according to the present invention.
Figure 3:
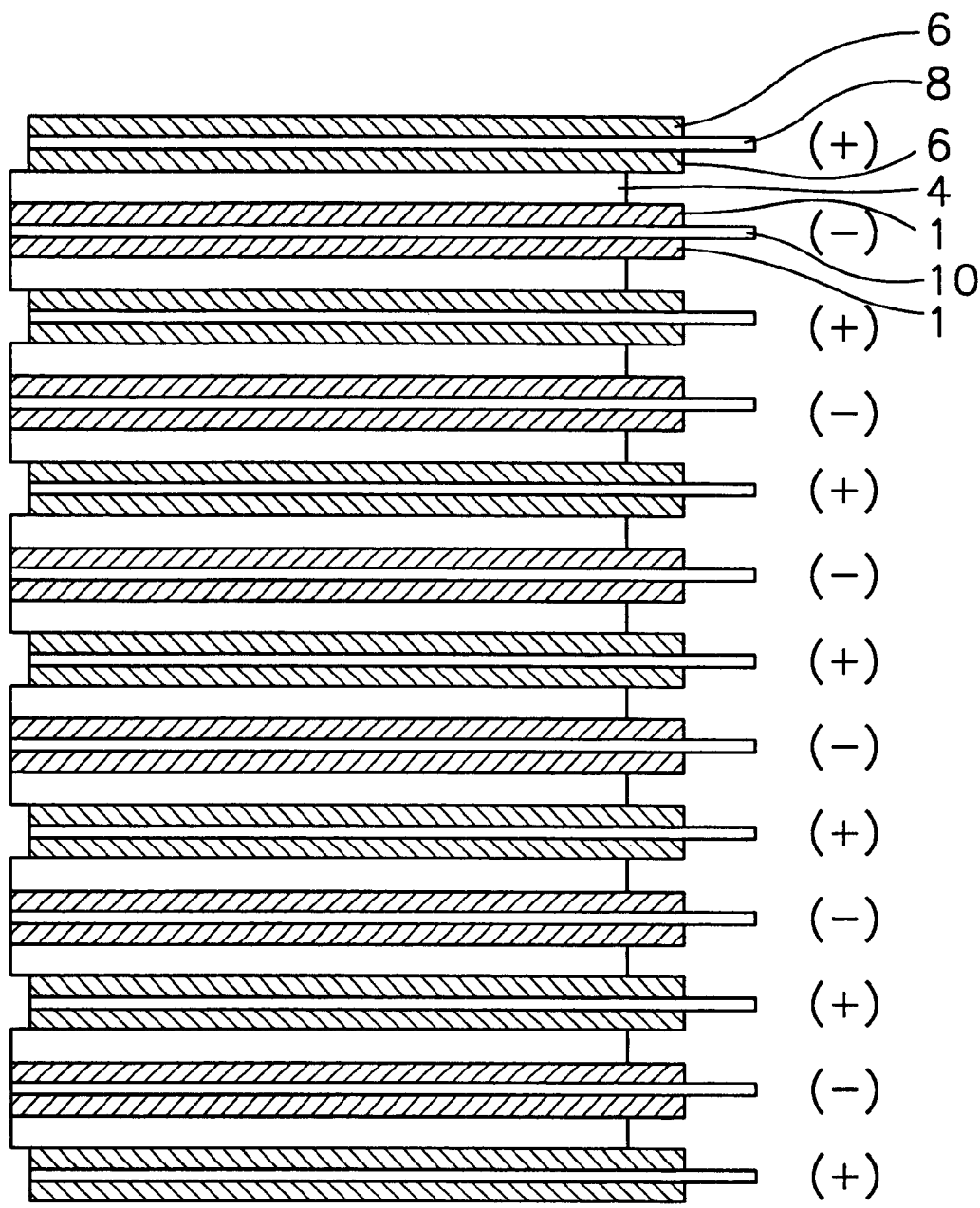
FIG. 3 is a schematic diagram for showing a lithium secondary battery having a multi-layered structure which includes a polymer electrolyte composition according to the present invention.

FIG. 1 is a schematic diagram for showing a planar structure of a lithium secondary battery including a polymer electrolyte composition according to the present invention, FIG. 2 is a schematic diagram for showing a structure of a lithium secondary cell including a polymer electrolyte composition according to the present invention and FIG. 3 is a schematic diagram for showing a lithium secondary battery having a multi-layered structure which includes a polymer electrolyte composition according to the present invention.

Referring to FIGS. 1–3, lithium secondary battery includes an anode 1, a polymer electrolyte 4 and a cathode 6.

Cathode 6 is manufactured by coating commonly used lithium metal oxide onto a current collector, aluminum foil 8. The lithium metal oxide is coated on both sides of aluminum foil 8 to a thickness of 20–100 μm.

Anode 1 is manufactured by coating commonly used lithium metal onto both sides of a current collector, copper foil 10 to a thickness of 25–50 μm.

Between cathode 6 and anode 1, polymer electrolyte 4 is provided. Polymer electrolyte 4 can be provided between cathode 6 and anode 1 by directly coating the polymer electrolyte solution onto cathode 6 or anode 1, or by forming a film using the polymer electrolyte solution by means of a doctor blade method and then attaching thus obtained film onto cathode 6 or anode 1.

Preferably, polymer electrolyte 4 is formed by directly coating the polymer electrolyte solution on cathode 6 or anode 1. At this time, the pores of the electrodes are impregnated with the polymer electrolyte components to improve the ion transmission characteristic at the electrodes and to form the uniform interface between the electrodes and the electrolyte. In addition, onto polymer electrolyte 4 coated and formed on the first electrode, the second electrode is adhered to obtain a lithium secondary battery having an integrated structure of anode 1, polymer electrolyte 4 and cathode 6.

When the polymer electrolyte is formed by directly coating the polymer electrolyte solution onto the electrode, it is preferred that an area wider than each electrode is coated by polymer electrolyte solution to avoid a contact between the electrodes. Otherwise, a minute contact between the anode and the cathode generates an electric short.

Through providing polymer electrolyte 4 between anode 1 and cathode 6, a lithium secondary battery having a multi-layered cell or a mono-cell can be manufactured.

Taps are attached on cathode 6 and anode 1 on which electrolytes are not formed, and thus formed structure is loaded in a case (not shown). Then, a constant amount of liquid solvent is injected into the case.

At this time, since the electrodes in the integrated cell are not impregnated with a sufficient amount of liquid electrolyte, an additional impregnation process can be implemented. For example, the solvent can be injected into the cell case so that the electrodes are impregnated with the solvent. Otherwise, the integrated cell can be immersed into the solvent under an atmospheric pressure or a pressurized condition for a predetermined time.

As for the solvent, ethylene carbonate (EC), propylene carbonate (PC), diethyl carbonate (DEC), dimethyl carbonate (DMC), ethyl methyl carbonate (EMC), gamma-butyrolactone (γ-BL) or a mixture thereof along with at least one salt of lithium perchlorate (LiClO$_4$), lithium trifluoromethane sulfonate (LiCF$_3$SO$_3$), lithium borofluoride (LiBF$_4$), lithium hexafluorophosphate (LiPF$_6$) and lithium arsenic hexafluoride (LiAsF$_6$) can be utilized. This solvent can be different from the solvent utilized for the preparation of the polymer electrolyte. Preferably, the solvent utilized for the preparation of the polymer electrolyte is selected considering the mechanical strength and the adhesiveness of the electrolyte, while the additionally injected solvent is selected considering a high capacity and performance at high and low temperature of the battery.

The case is sealed utilizing a vacuum packaging apparatus and an aging process is implemented at about 25–80° C. for a certain time, for example, for about 1–48 hours to homogenize the components in the cell. Then, the battery is charged by a constant current at about 0.1–0.2C rate and then is discharged by a constant current condition at 0.1–0.2C rate. This charge/discharge process is repeated for 2–5 times. At this time, gases generated within the cell is removed through a degassing and vacuum sealing process.

In order to improve the performance of the battery, an aging process at 25–80° C. can be additionally implemented after the repetition of the charge/discharge process.

The preferred embodiments of the present invention will be described in detail below. However, it should be understood that the present invention is not limited to the following examples.

EXAMPLE 1

1 g of Kynar 2801 (purchased from Atochem Inc.) as a polyvinylidene fluoride-based polymer, 1 g of polymethyl methacrylate (purchased from Aldrich Inc.) and 10 g of a mixture solution of ethylene carbonate/dimethyl carbonate (1/1 by weight) in which 1M of $LiPF_6$ was dissolved, were mixed at room temperature. Thus obtained mixture was heated to about 80° C. for 1 hour and then to about 120° C. for 15 minutes to prepare an electrolyte solution. An electrolyte film having 60 μm thickness was manufactured by means of a doctor blade method. Thus obtained polymer electrolyte illustrated an ionic conductivity of $3.2 \times 10^{-3}$ S/cm.

The polymer electrolyte illustrated a good mechanical strength, and did not break at length two times of the original length.

A cathode and an anode are integrated on both sides of the polymer electrolyte to form a cell. A mixture solution of ethylene carbonate/dimethyl carbonate (1/1 by weight) in which 1M of $LiPF_6$ was dissolved, was additionally injected into the cell. The cell was loaded in a case to manufacture a lithium secondary battery.

EXAMPLE 2

1 g of polyacrylonitrile (purchased from Aldrich Inc., Mw: 150,000), 0.5 g of Kynar 761 (purchased from Atochem Inc.) as polyvinylidene fluoride-based polymer and 12 g of a mixture solution of ethylene carbonate/ dimethyl carbonate/propylene carbonate (2/0.75/0.25 by weight) in which 1M of $LiPF_6$ was dissolved, were mixed at room temperature. Thus obtained mixture was heated to about 80° C. for 1 hour and then to about 120° C. for 30 minutes to prepare an electrolyte solution. An electrolyte film having 70 μm thickness was manufactured by means of a doctor blade method. Thus obtained polymer electrolyte illustrated an ionic conductivity of $3.6 \times 10^{-3}$ S/cm.

A cathode and an anode are integrated on both sides of the polymer electrolyte to form a cell. A mixture solution of ethylene carbonate/dimethyl carbonate (1/1 by weight) in which 1M of $LiPF_6$ was dissolved, was additionally injected into the cell. The cell was loaded in a case to manufacture a lithium secondary battery.

EXAMPLE 3

1 g of polyacrylonitrile (purchased from Aldrich Inc., Mw: 150,000), 0.5 g of Kynar 761 (purchased from Atochem Inc.) as polyvinylidene fluoride-based polymer and 12 g of a mixture solution of ethylene carbonate/ dimethyl carbonate/γ-butyrolactone (1/0.5/0.5 by weight) in which 1M of $LiPF_6$ was dissolved, were mixed at room temperature. An electrolyte film having 50 μm thickness was manufactured by means of a doctor blade method. Thus obtained polymer electrolyte illustrated an ionic conductivity of $3.0 \times 10^{-3}$ S/cm. The polymer electrolyte illustrated a good mechanical strength, and did not break at length 1.8 times of the original length.

A cathode and an anode are integrated on both sides of the polymer electrolyte to form a cell. A mixture solution of ethylene carbonate/dimethyl carbonate/ethyl methyl carbonate (1/1.5/1.5 by weight) in which 1M of $LiPF_6$ was dissolved, was additionally injected into the cell. The cell was loaded in a case to manufacture a lithium secondary battery.

EXAMPLE 4

1 g of polyacrylonitrile (purchased from Aldrich Inc., Mw: 150,000), 0.5 g of Kynar 761 (purchased from Atochem Inc.) as polyvinylidene fluoride-based polymer and 12 g of a mixture solution of ethylene carbonate/ dimethyl carbonate/ethyl methyl carbonate (1/1.5/1.5 by weight) in which 1M of $LiPF_6$ was dissolved, were mixed at room temperature. An electrolyte film having 50 μm thickness was manufactured by means of a doctor blade method. Thus obtained polymer electrolyte illustrated an ionic conductivity of $3.8 \times 10^{-3}$ S/cm. The polymer electrolyte illustrated a good mechanical strength, and did not break at length 1.8 times of the original length.

A cathode and an anode are integrated on both sides of the polymer electrolyte to form a cell. A mixture solution of ethylene carbonate/propylene carbonate/ethyl methyl carbonate (0.3/0.1/0.6 by weight) in which 1M of $LiPF_6$ was dissolved, was additionally injected into the cell. The cell was loaded in a case to manufacture a lithium secondary battery.

EXAMPLE 5

4 g of Kynar 2801 (purchased from Atochem Inc.) as polyvinylidene fluoride copolymer, 1 g of polymethyl methacrylate (purchased from Aldrich Inc.) and 35 g of a mixture solution of ethylene carbonate/dimethyl carbonate/ethyl methyl carbonate (1/0.8/0.5 by weight) in which 1M of $LiPF_6$ was dissolved, were mixed at room temperature. Thus obtained mixture was heated to about 80° C. for 1 hour and then to about 120° C. for 30 minutes to prepare an electrolyte solution. The electrolyte solution was coated onto a carbon anode by utilizing an applicator having a 70 μm gap by means of a doctor blade method. Thus obtained polymer electrolyte illustrated an ionic conductivity of $2.8 \times 10^{-3}$ S/cm.

A cathode and an anode are integrated on both sides of the polymer electrolyte to form a cell. A mixture solution of ethylene carbonate/propylene carbonate/ethyl methyl carbonate (0.4/0.3/0.3 by weight) in which 1M of $LiPF_6$ was dissolved, was additionally injected into the cell. The cell was loaded in a case to manufacture a lithium secondary battery.

EXAMPLE 6

3.5 g of Kynar 2801 (purchased from Atochem Inc.) as polyvinylidene fluoride copolymer, 0.5 g of Kynar 761 (purchased from Atochem Inc.) as polyvinylidene fluoride and 35 g of a mixture solution of ethylene carbonate/ dimethyl carbonate/ethyl methyl carbonate (1/0.8/0.5 by weight) in which 1M of $LiPF_6$ was dissolved, were mixed at room temperature. The electrolyte solution was coated onto a carbon anode by utilizing an applicator having a 70 μm gap by means of a doctor blade method. Thus obtained polymer electrolyte illustrated an ionic conductivity of $3.0 \times 10^{-3}$ S/cm.

A cathode and an anode are integrated on both sides of the polymer electrolyte to form a cell. A mixture solution of ethylene carbonate/propylene carbonate/ethyl methyl carbonate (0.4/0.3/0.3 by weight) in which 1M of $LiPF_6$ was dissolved, was additionally injected into the cell. The cell was loaded in a case to manufacture a lithium secondary battery.

EXAMPLE 7

4 g of Kynar 2801 (purchased from Atochem Inc.) as polyvinylidene fluoride copolymer, 1 g of polymethyl methacrylate (purchased from Aldrich Inc.) and 35 g of a mixture solution of ethylene carbonate/dimethyl carbonate/ethyl methyl carbonate (1/0.8/0.5 by weight) in which 1M of LiPF$_6$ was dissolved, were mixed at room temperature. The electrolyte solution was coated onto a carbon anode by utilizing an applicator having a 70 μm gap by means of a doctor blade method. A lithium secondary battery was manufactured by the same procedure described in Example 6.

EXAMPLE 8

1 g of polyacrylonitrile (purchased from Aldrich Inc.) 0.2 g of polymethyl methacrylate (purchased from Aldrich Inc., Mw: 150,000), 0.5 g of Kynar 761 (purchased from Atochem Inc.) as polyvinylidene fluoride and 12 g of a mixture solution of ethylene carbonate/dimethyl carbonate/γ-butyrolactone (1/0.5/0.5 by weight) in which 1M of LiPF$_6$ was dissolved, were mixed at room temperature. Thus obtained mixture was heated to about 80° C. for 1 hour and then to about 120° C. for 30 minutes to prepare an electrolyte solution. An electrolyte film having a 50 μm thickness was manufactured by means of a doctor blade method.

A cathode and an anode are integrated on both sides of the polymer electrolyte to form a cell. A mixture solution of ethylene carbonate/dimethyl carbonate/ethyl methyl carbonate (1/1.5/1.5 by weight) in which 1M of LiPF$_6$ was dissolved, was additionally injected into the cell. The cell was loaded in a case to manufacture a lithium secondary battery.

EXAMPLE 9

1 g of polyacrylonitrile (purchased from Aldrich Inc.), 0.5 g of Kynar 761 (purchased from Atochem Inc.) as polyvinylidene fluoride and 12 g of a mixture solution of ethylene carbonate/dimethyl carbonate/γ-butyrolactone (1/0.5/0.5 by weight) in which 1M of LiPF$_6$ was dissolved, were mixed at room temperature. The electrolyte solution was coated onto a carbon anode by utilizing an applicator having a 50 μm gap by means of a doctor blade method. A lithium secondary battery was manufactured by the same procedure described in Example 8.

COMPARATIVE EXAMPLE 1 g of Kynar 2801 (purchased from Atochem Inc.) as polyvinylidene fluoride-based polymer and 5 g of a mixture solution of ethylene carbonate/dimethyl carbonate (1/1 by weight) in which 1M of LiPF$_6$ was dissolved, were mixed at room temperature. Thus obtained mixture was heated to about 80° C. for 1 hour and then to about 120° C. for 30 minutes to prepare an electrolyte solution. An electrolyte film was manufactured by the conventional method. The anode and the cathode were attached on the upper and lower portions of the electrolyte film by the conventional method. At this time, the anode and the electrolyte did not adhere under a pressure of 1–10 g/cm$^2$.

PERFORMANCE TEST

Figure 4:
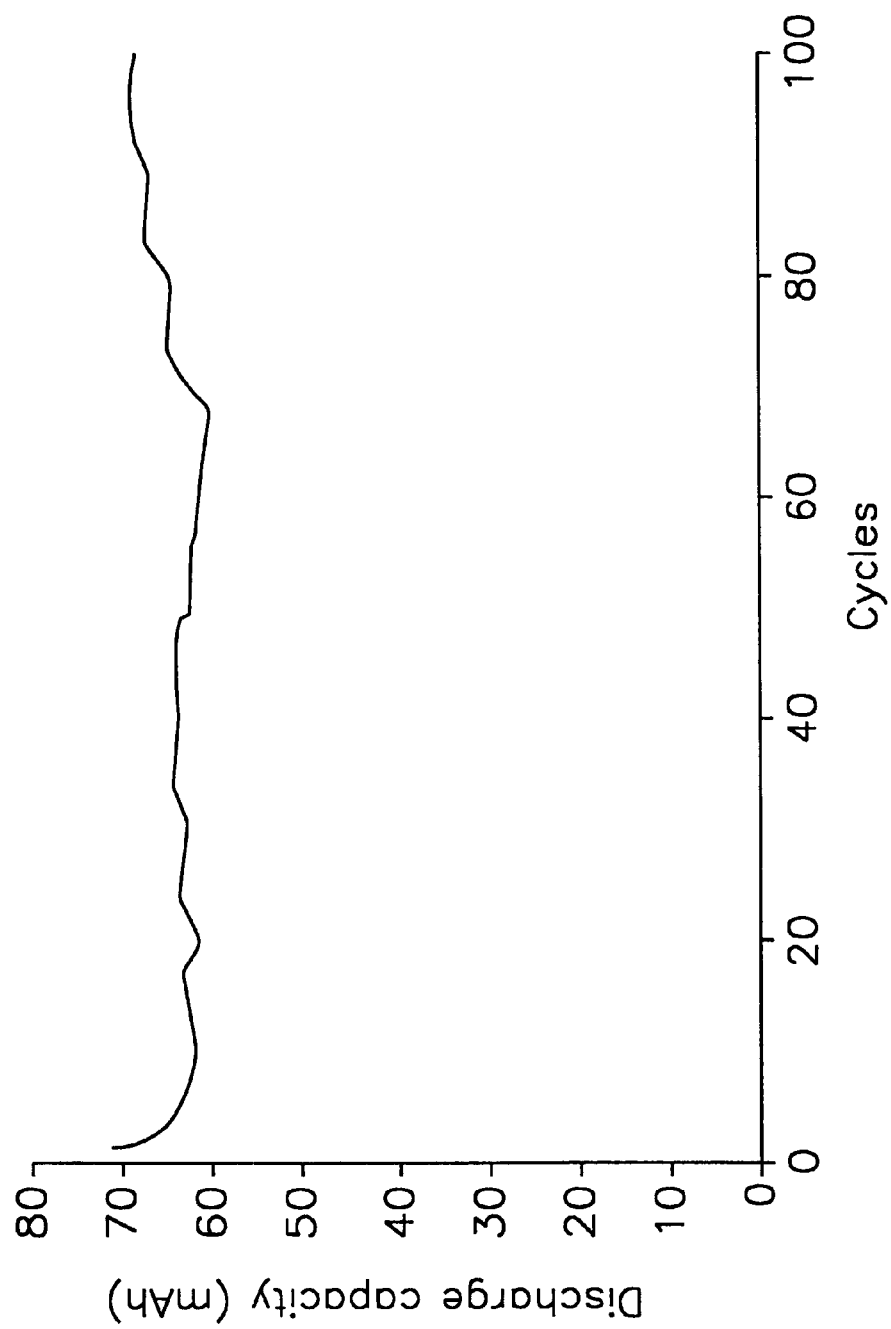
FIG. 4 illustrates a graph for showing discharge capacity as a function of cycle number of a lithium secondary battery including a polymer electrolyte composition prepared by Example 1 in the present invention.

FIG. 4 illustrates a graph for showing a cycle lifetime characteristic at 1C rate of a lithium secondary battery including a polymer electrolyte composition prepared by Example 1.

The capacity of the cell was 7.5 mAh. The cell was charged by a constant current of 1C rate until the voltage of the cell reached 4.2 V, then it was charged by a constant current until the current decreased to 25 mAh while keeping the voltage of 4.2 V, and then discharged at 1C rate. This cycle was repeated to test the cycle lifetime characteristics.

According to FIG. 4, it can be found that a constant discharge capacity can be obtained for about 100 cycles when implementing 1C rate of charge/discharge process.

Figure 5:
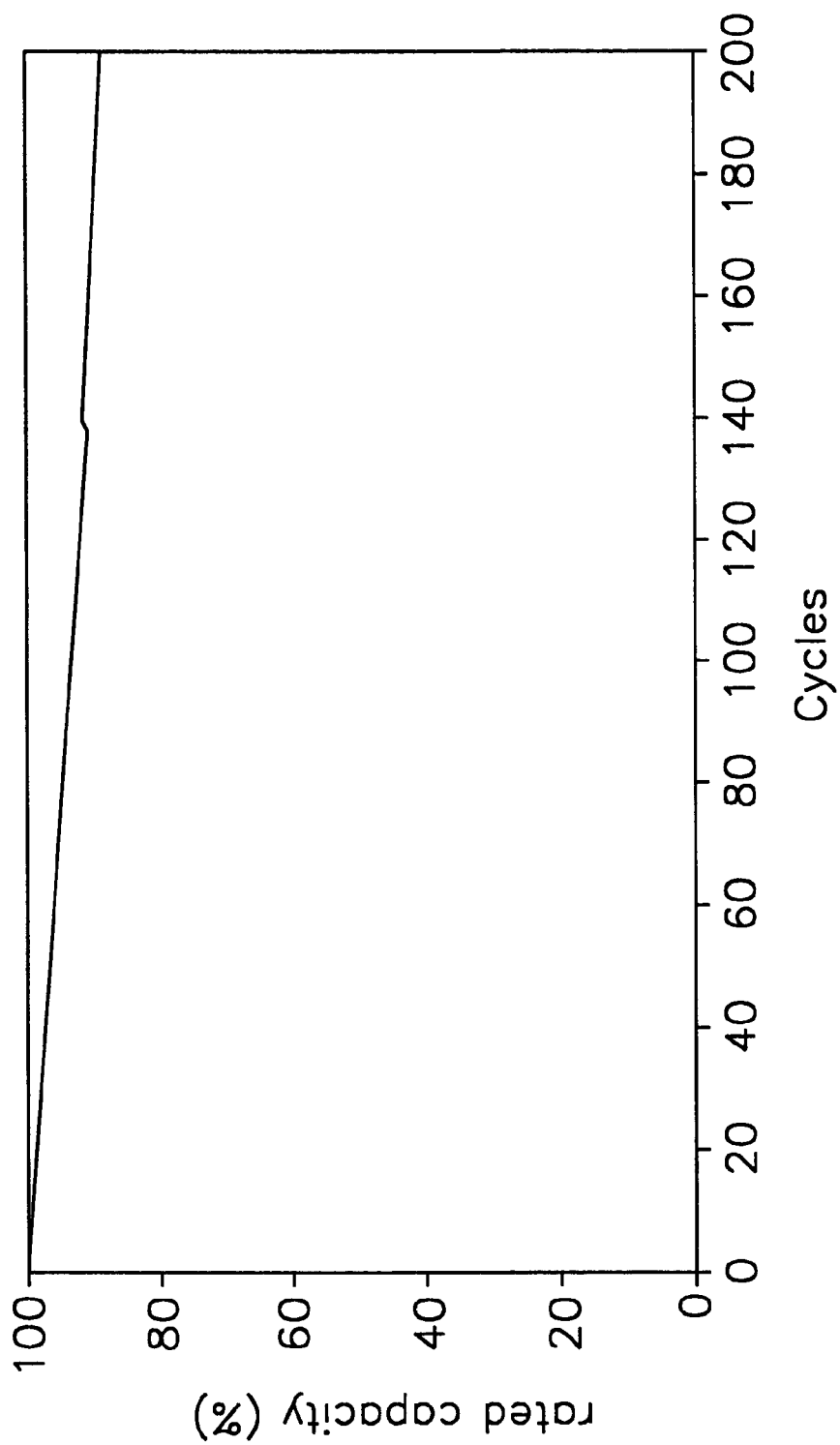
FIG. 5 illustrates a graph for showing a percent discharge capacity as a function of cycle number of a lithium secondary battery including a polymer electrolyte composition prepared by Example 2 in the present invention.
Figure 11:
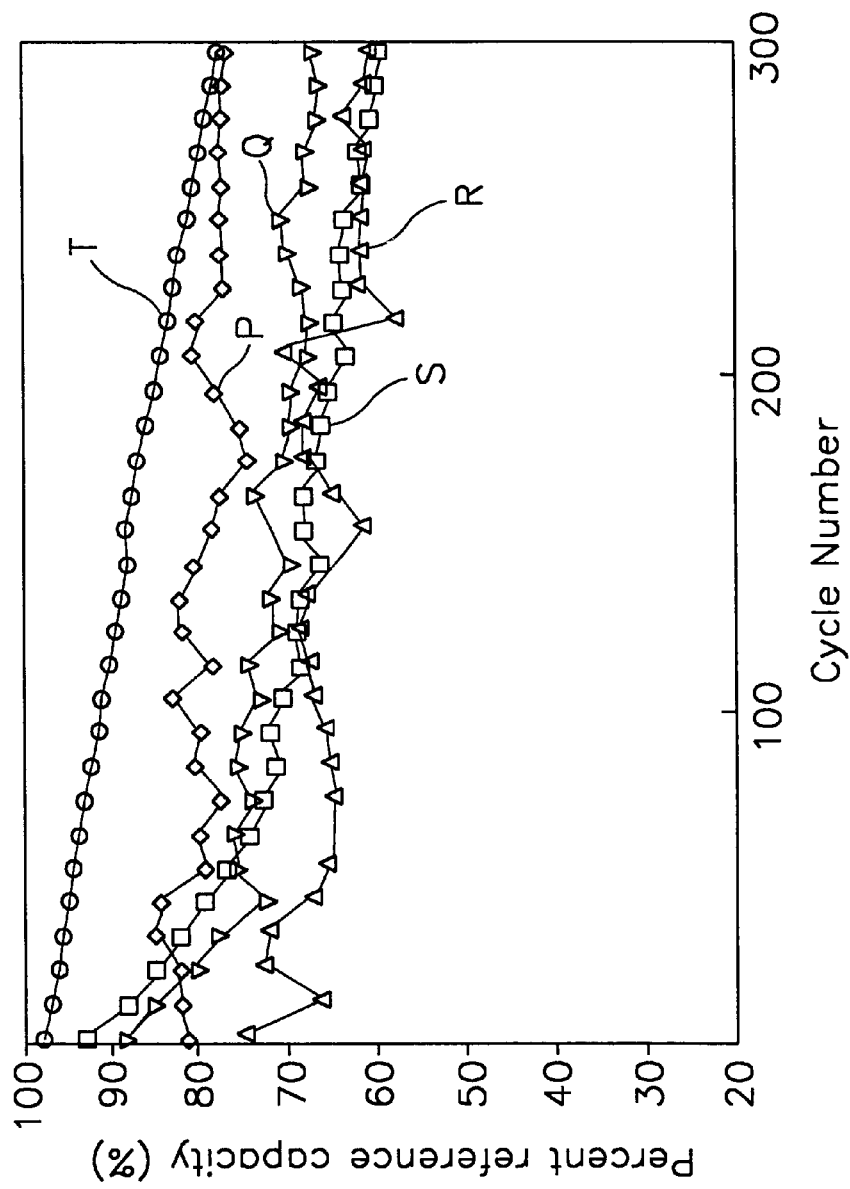
FIG. 11 illustrates graphs for showing a charge/discharge characteristic of a lithium secondary battery including a polymer electrolyte composition prepared by Example 2 in the present invention with respect to those of the batteries manufactured by other companies.

FIG. 5 illustrates a graph for showing a cycle characteristics at 1C rate of a lithium secondary battery including a polymer electrolyte composition prepared by Example 2, and FIG. 11 illustrates graphs for showing a cycle characteristic at 1C rate of a lithium secondary battery including a polymer electrolyte composition prepared by Example 2 with respect to those of the batteries manufactured by other companies.

Batteries from Shubila(S), Matsushita(R), GS-Melcotec (Q) and IIET(P) were utilized. The capacity of the batteries of Shubila, Matsushita and GS-Melcotec is 500 mAh and that of IIET is 960 mAh.

According to FIGS. 5 & 11, it can be confirmed that the lithium secondary battery of the present invention illustrates a constant and high discharge capacity.

Figure 6:
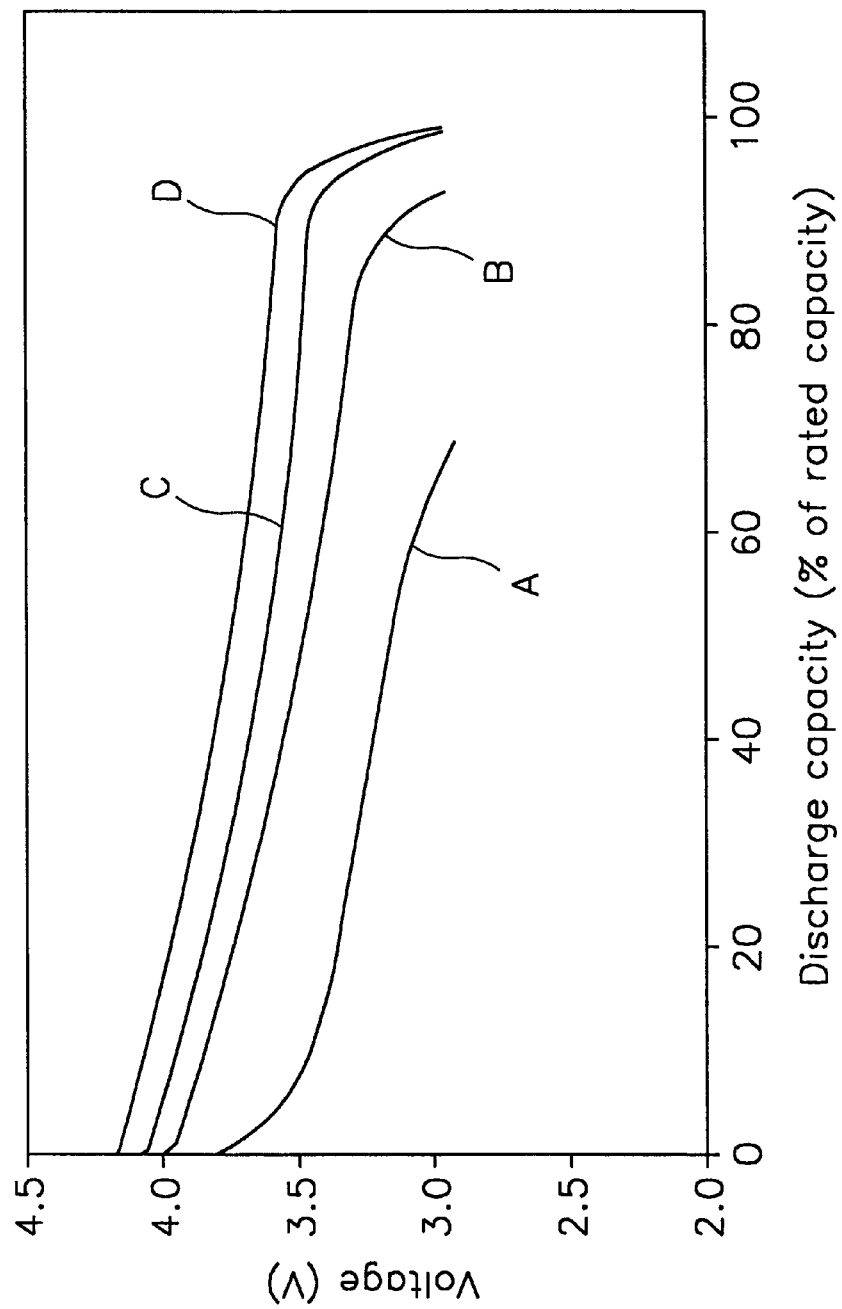
FIG. 6 illustrates graphs for showing rated capacity of a lithium secondary battery including a polymer electrolyte composition prepared by Example 3 in the present invention.

FIG. 6 illustrates graphs for showing rated capacities of a lithium secondary battery including a polymer electrolyte composition prepared by Example 3. In FIG. 6, D corresponds to a graph when the battery is charged/discharged by 0.2C, C corresponds to a graph when charged/discharged by 0.5C, B corresponds to a graph when charged/discharged by 1C and A corresponds to a graph when charged/discharged by 2C.

Figure 7:
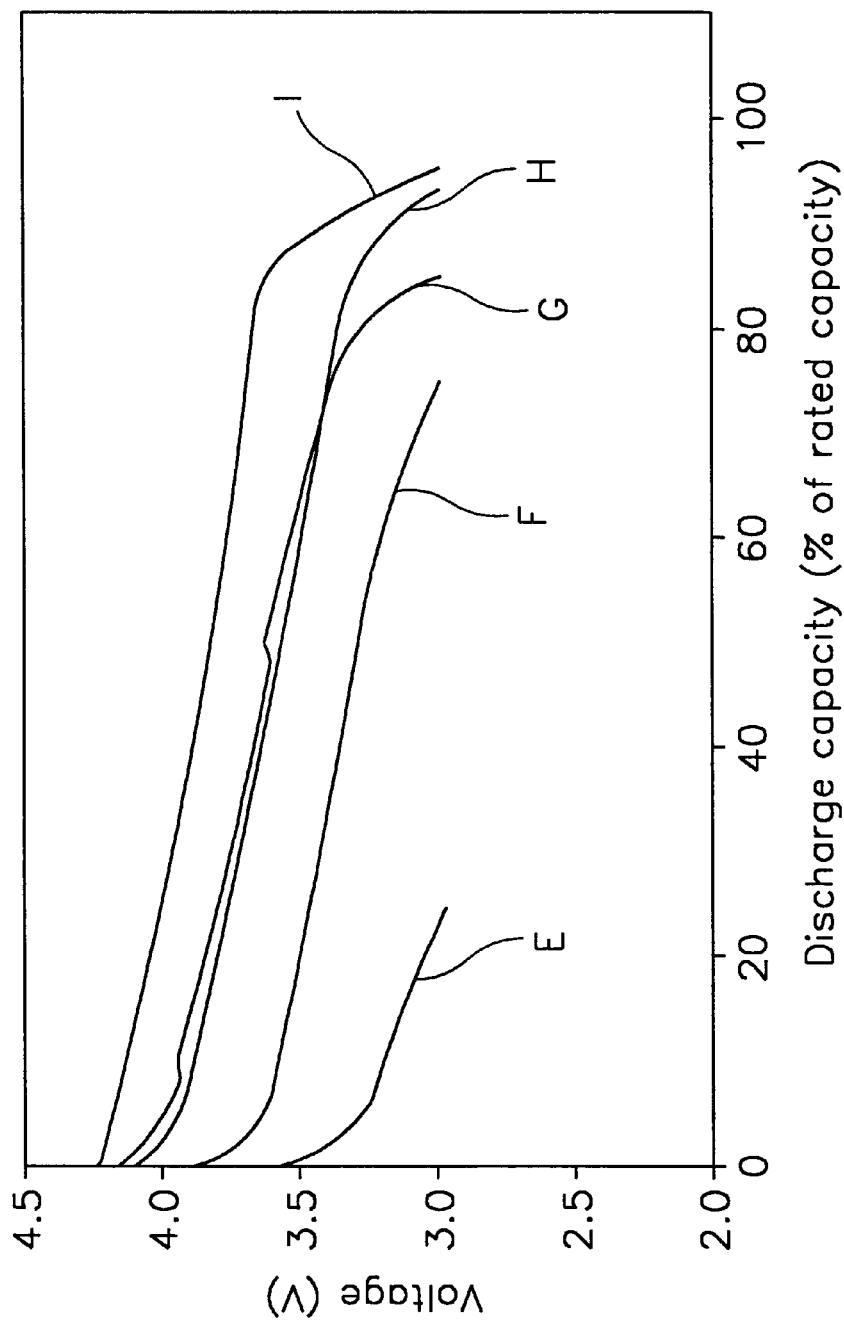
FIG. 7 illustrates graphs for showing discharging characteristics at high and low temperatures of a lithium secondary battery including a polymer electrolyte composition prepared by Example 4 in the present invention.

FIG. 7 illustrates graphs for showing discharging characteristics at high and low temperatures of a lithium secondary battery including a polymer electrolyte composition prepared by Example 4. The battery is charged at room temperature by 0.5C, stored at a given temperature for 1 hour and then discharged at the same given temperature by 0.2C. In FIG. 7, the given temperature of graph E corresponds to −20° C., F to −10° C., H to 0° C., I to 60° C. and G to 80° C.

Figure 8:
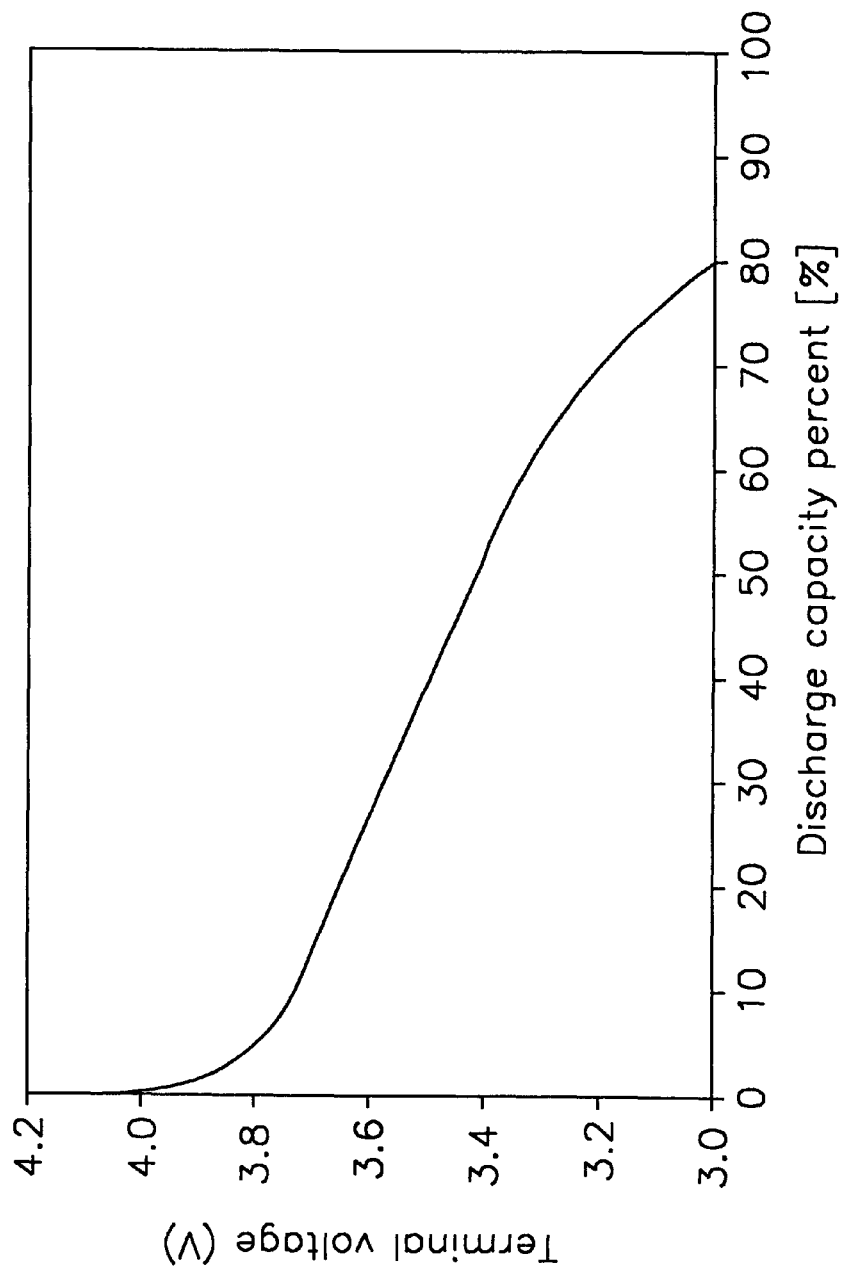
FIG. 8 illustrates a graph for showing a discharge capacity at a low temperature of a lithium secondary battery including a polymer electrolyte composition prepared by Example 5 in the present invention.

FIG. 8 illustrates a graph for showing a discharging characteristic at a low temperature of a lithium secondary battery including a polymer electrolyte composition prepared by Example 5.

Test on the discharging characteristic at low temperature was carried out as follows. The lithium secondary battery was charged at room temperature by 0.2C rate, stood at −10° C. for 1 hour and then discharged by 0.2C. Then, the discharge graph was designated.

Figure 9:
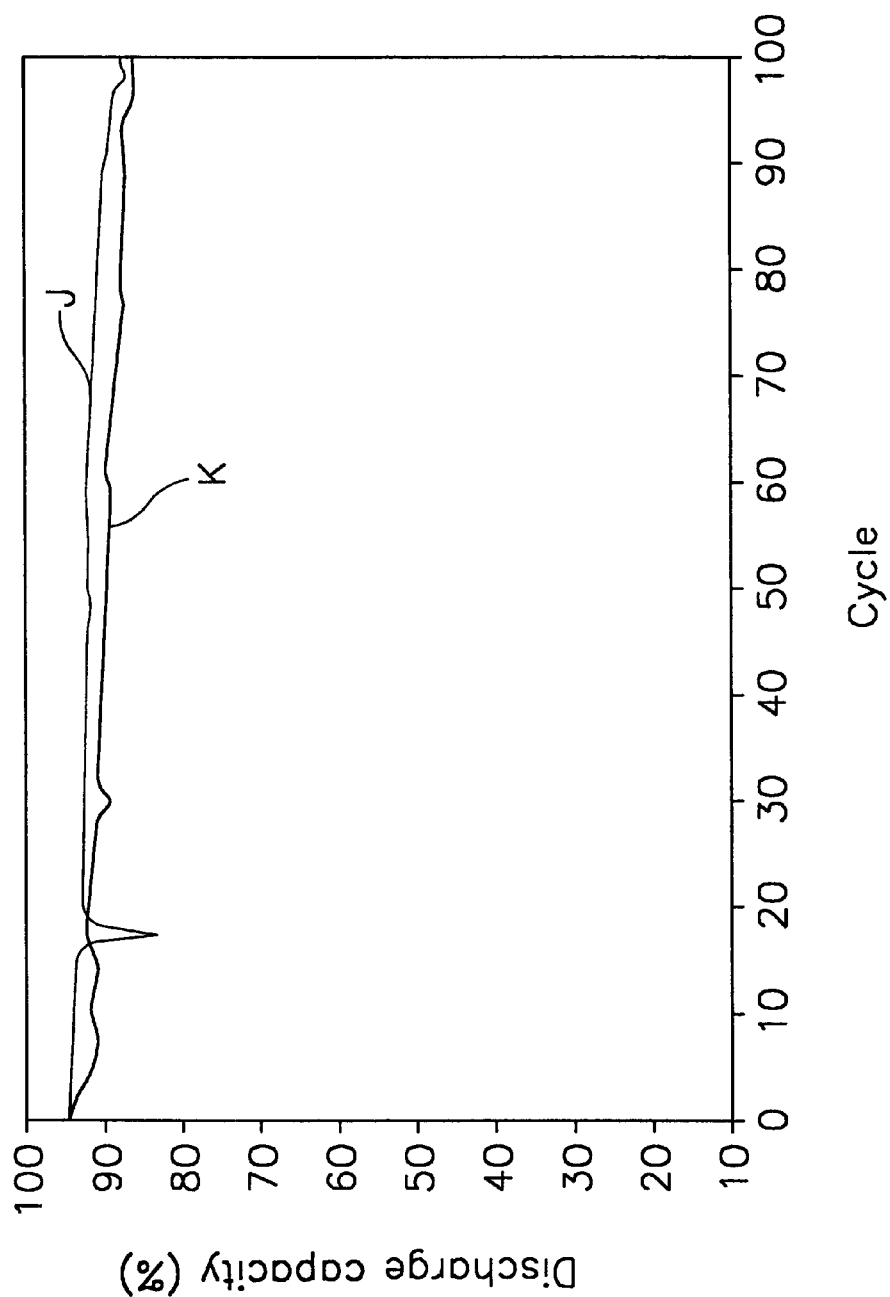
FIG. 9 illustrates graphs for showing discharge capacity as a function of cycle number of lithium secondary batteries including polymer electrolyte compositions prepared by Examples 6 & 7 in the present invention.

FIG. 9 illustrates graphs for showing cycle lifetime characteristics at 1C rate of lithium secondary batteries including polymer electrolyte compositions prepared by Examples 6 & 7.

Referring to FIG. 9, it can be found that lithium battery obtained from Example 6 including polyvinylidene fluoride illustrated better lifetime cycle characteristic(J) than that obtained from Example 7 which did not include polyvinylidene fluoride(K). It can be determined that more uniform impregnation of the electrodes with the solvent is accomplished by the addition of polyvinylidene fluoride to obtain a better cycle characteristic.

Figure 10:
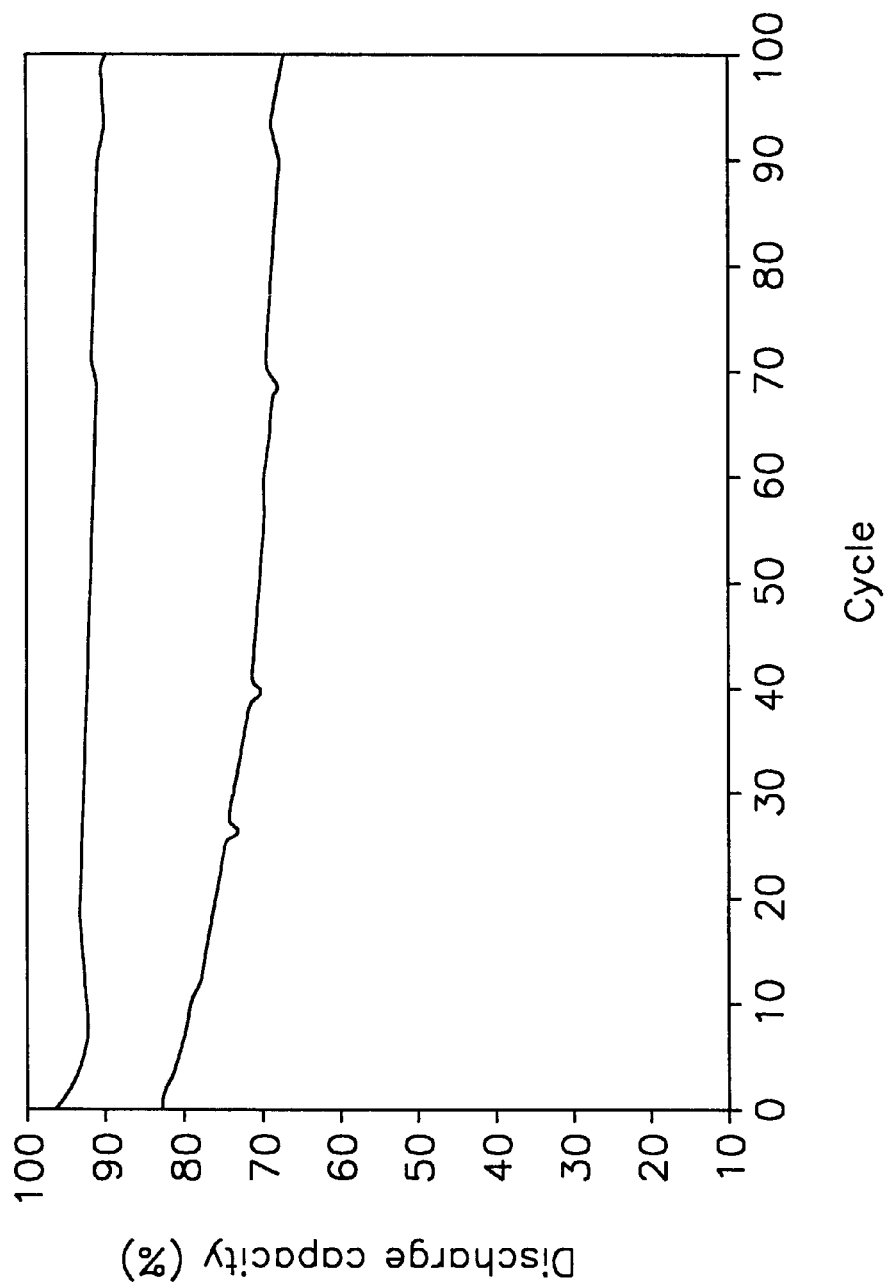
FIG. 10 illustrates graphs for showing discharge capacity as a function of cycle number of lithium secondary batteries including polymer electrolyte compositions prepared by Examples 8 & 9 in the present invention.

FIG. 10 illustrates graphs for showing lifetime cycle characteristics at 1C rate of lithium secondary batteries including polymer electrolyte compositions prepared by Examples 8 & 9. Referring to FIG. 10, the lithium battery obtained from Example 8 including polymethyl methacrylate illustrates a better cycle lifetime characteristic(L) than that obtained from Example 9(M). A small amount of polymethyl methacrylate added to the electrolyte improves the adhesiveness to the electrodes and provides a uniform interface between the electrodes and the electrolyte.

As described above in the present invention, a polymer electrolyte is prepared by utilizing polyvinylidene fluoride-based polymer which has a good mechanical strength, polymethyl methacrylate polymer which has a good affinity and polyacrylonitrile polymer which has a good adhesiveness. Thus, the mechanical strength and adhesiveness to the electrodes of the polymer electrolyte can be improved and a lithium secondary battery having a stable charge/discharge characteristic and a high capacity can be manufactured. In addition, due to the strong affinity of the electrolyte for the solvent, a leakage and evaporation of the solvent can be minimized. The polymer electrolyte can be applied to an electrolyte of a capacitor and an electrolyte of a sensor as well as an electrolyte of the lithium secondary battery.

While the present invention is described in detail referring to the attached embodiments, various modifications, alternate constructions and equivalents may be employed without departing from the true spirit and scope of the present invention.

What is claimed is:

1. A method for preparing a polymer electrolyte composition comprising the steps of:

mixing a) a polymer mixture including polyvinylidene fluoride-based polymer and at least one polymer selected from the group consisting of polyacrylonitrile and polymethyl methacrylate, and b) a solvent in which a lithium salt is dissolved, in a mixing ratio range of about 1:3–10 by weight; and heating thus obtained mixture.

2. A method for preparing a polymer electrolyte composition as claimed in claim 1, wherein said polymer mixture comprises about 25–90% by weight of said polyvinylidene fluoride-based polymer and about 10–75% by weight of said at least one polymer selected from the group consisting of polyacrylonitrile and polymethyl methacrylate.

3. A method for preparing a polymer electrolyte composition as claimed in claim 1, wherein said step of heating includes the steps of:

i) firstly heating said mixture to about 25–100° C. for about 10 minutes to about 3 hours; and ii) secondly heating thus obtained reactant to about 100–180°0 C. for about 5–60 minutes.

4. A method for preparing a polymer electrolyte composition as claimed in claim 1, wherein said polyvinylidene fluoride-based polymer is at least one member selected from the group consisting of polyvinylidene fluoride and a copolymer of polyvinylidene fluoride.

5. A method for preparing a polymer electrolyte composition as claimed in claim 4, wherein said copolymer of polyvinylidene fluoride includes about 2–30% by weight of hexafluoropropylene based on a total amount of said copolymer.

6. A method for preparing a polymer electrolyte composition as claimed in claim 1, wherein said lithium salt comprises from about 0.5 to 2M of at least one member selected from the group consisting of lithium perchlorate ($LiClO_4$), lithium trifluoromethane sulfonate ($LiCF_3SO_3$), lithium borofluoride ($LiBF_4$), lithium hexafluorophosphate ($LiPF_6$) and lithium arsenic hexafluoride ($LiAsF_6$).

7. A method for preparing a polymer electrolyte composition as claimed in claim 1, wherein said solvent is at least one member selected from the group consisting of ethylene carbonate (EC), propylene carbonate (PC), diethyl carbonate (DEC), dimethyl carbonate (DMC), ethyl methyl carbonate (EMC) and gamma-butyrolactone (γ-BL).

8. A method for preparing a polymer electrolyte composition as claimed in claim 7, wherein about 50% by weight or less of said ethylene carbonate is contained in said solvent based on the total amount of said solvent.

9. A method for preparing a polymer electrolyte composition as claimed in claim 7, wherein from about 20–70% by weight of said solvent comprises said ethyl methyl carbonate, said diethyl carbonate and said dimethyl carbonate.

10. A method for preparing a polymer electrolyte composition as claimed in claim 7, wherein about 5–40% by weight of the solvent comprises said propylene carbonate and said γ-butyrolactone.

11. A method for preparing a polymer electrolyte composition as claimed in claim 1, wherein said polymer mixture comprises about 50–90% by weight of polyvinylidene fluoride and about 10–50% by weight of polymethyl methacrylate.

12. A method for preparing a polymer electrolyte composition as claimed in claim 1, wherein said polymer mixture comprises about 50–70% by weight of polyacrylonitrile and about 25–50% be weight of polyvinylidene fluoride.

13. A method for preparing a polymer electrolyte composition as claimed in claim 1, wherein said polymer mixture comprises about 50–90% by weight of polyvinylidene fluoride copolymer and about 10–50% by weight of polymethyl methacrylate.

14. A method for preparing a polymer electrolyte composition as claimed in claim 1, wherein said polymer mixture comprises about 50–90% by weight of polyvinylidene fluoride copolymer and polyvinylidene fluoride, and about 10–50% by weight of polymethyl methacrylate.

15. A method for preparing a polymer electrolyte composition as claimed in claim 14, wherein said polyvinylidene fluoride comprises about 40% by weight or less based on the total amount of said polyvinylidene fluoride copolymer and said polyvinylidene fluoride.

16. A method for preparing a polymer electrolyte composition as claimed in claim 1, wherein said polymer mixture comprises about 50–75% by weight of polyacrylonitrile and polymethyl methacrylate, and about 25–50% by weight of polyvinylidene fluoride.

17. A method for preparing a polymer electrolyte composition as claimed in claim 16, wherein said polymethyl methacrylate comprises about 30% by weight or less based on the total amount of said polymethyl methacrylate and said polyacrylonitrile.

* * * * *